Feb. 27, 1951 F. H. TEMPLETON 2,543,386
CUTTERHEAD FOR HARVESTING MACHINES
Filed April 9, 1949 2 Sheets-Sheet 1

INVENTOR
FRED H. TEMPLETON
BY
G. F. McDougall
ATTORNEY

Feb. 27, 1951   F. H. TEMPLETON   2,543,386
CUTTERHEAD FOR HARVESTING MACHINES
Filed April 9, 1949   2 Sheets-Sheet 2

INVENTOR
FRED H. TEMPLETON
BY
ATTORNEY

Patented Feb. 27, 1951

2,543,386

UNITED STATES PATENT OFFICE 2,543,386

CUTTERHEAD FOR HARVESTING MACHINES

Fred H. Templeton, Hayward, Calif.; Emma May Templeton, executrix of said Fred H. Templeton, deceased, assignor to Templeton Harvester, Inc., Oakland, Calif., a corporation of California Application April 9, 1949, Serial No. 86,548

7 Claims. (Cl. 56—154)

This invention relates to an improved cutter head for harvesting machines, which is in part an improvement carrying forward the upstanding air moving vanes associated with cutting teeth, as disclosed in my U. S. Patent No. 2,474,557, dated June 28, 1949.

The object of the present invention is to so improve the cutter head originally disclosed that a much smaller suction fan is required and to develop the upstanding air moving vanes of the earlier disclosure to an extent that, with proper associated structure, a suction nozzle to pick up cut grain becomes much simplified if not wholly unnecessary.

The overall object of the invention is to save grain, when used on the well known "combine" harvester and to wholly dispense with the conventional reel that is believed to have formed an important and indispensable part of every successful harvester since the reaper was invented. Combines, or headers, work well only when the standing grain is bone dry. Harvesting weather is nearly always so hot and dry that the first touch of the reel to standing grain rattles anywhere from two to more bushels of grain per acre to the ground where it is wasted.

A preferred embodiment of the invention is shown in the accompanying drawings, which show a successful form of the present improvement and are made a part of this present disclosure.

Figure 1:
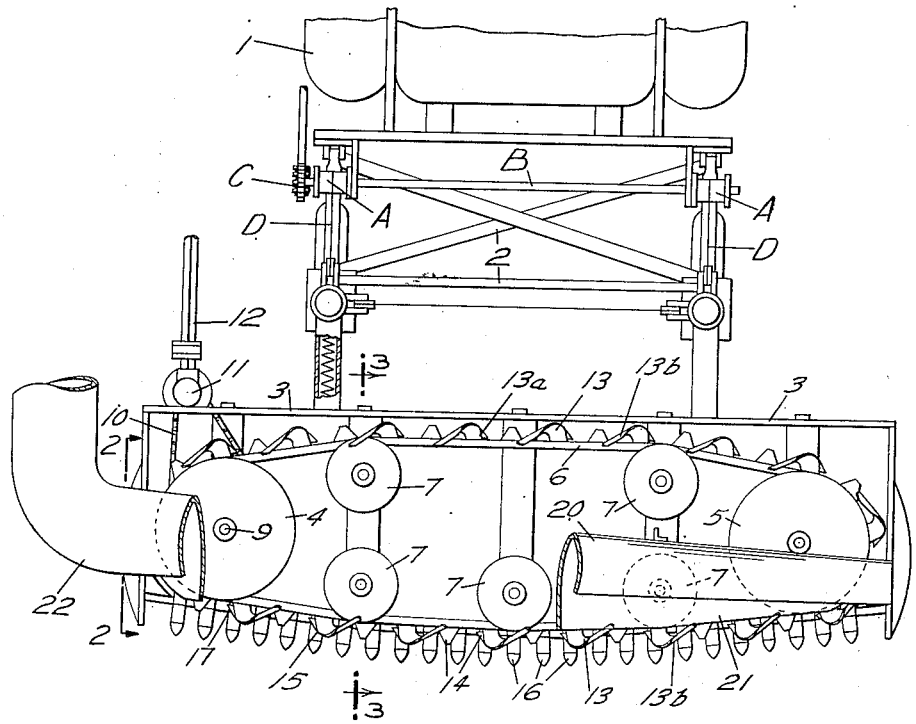
Fig. 1 is a plan view of the cutter head, shown mounted directly ahead of an automotive vehicle, of which only a fragment is shown to give its location, and with a part of the tube 22 broken away to show the construction underneath it.

Describing the drawings in greater detail: Numeral 1 indicates a fragment of the forward end of an automotive vehicle, such as a truck, and numeral 2 diagrammatically indicates a parallel motion structure by which the cutter head frame 3, may be raised and lowered. These parts form no part of the invention herein and need no further description, as their purpose and structure are well understood.

Suitably mounted within the frame 3, are a plurality of grooved pulleys one of which is a drive pulley 4, 5 is a driven pulley opposite pulley 4 in the closed V type belt 6. Idler pulleys are shown at 7, of which five are shown, one dotted, the purpose of which will be explained.

It is to be well understood that the V belt is merely the preferred type and that the whole arrangement for supporting an endless belt of suitable type for carrying the cutter knives and their associated air moving vanes, is schematic only and may be varied widely without departure from the invention, which is particularly pointed out in the claims.

The drive pulley 4, is shown to have a sprocket 8, as a companion on its mounting shaft 9, which engages a drive chain 10, the latter being driven by a powerful hydraulic motor 11, which is operated by hydraulic energy through the double conduit 12, which contains twin channels and is operated by a pump, not shown, carried by the vehicle 1. This drive is schematic only and may be substituted for, at will.

The purpose of the drive is to impart unidirectional revolving motion to the V belt and thus to a plurality of upstanding air moving volute vanes 13, the purpose of which is to create a strong suction just ahead of the cutter knives 14, the points of which 15, are nearly conterminous with the lower leading part of a vane 13, at 13a. These vanes, when proportioned and formed about as shown, with an inwardly rolled and backwardly curved wing portion 13b, and having a considerable projected area, will move air in surprising volume when the V belt 6, is run at say from sixteen hundred to twenty-four hundred feet per minute, which creates a strong inward draft affecting the standing grain, just as it is about to be contacted by the cutting knives 14. As shown, it is expedient to have twice as many cutter knives 14, as upstanding vanes 13, in order to get sufficient area of vane surface, which may be accomplished to advantage by leaving a substantial air gap under wing portion 13b of each vane. The circles 13', Fig. 5, indicate the fastenings by which the vanes 13 are secured to the belt 6.

It will be at once apparent that the force required to suck air inwardly in such volume as will make a good substitute for a reel, will have a strong tendency to twist the V belt 6; hence the placement of several grooved pulleys, such as 7, back of the leading reach of the belt 6, will counteract the twist. The belt 6, in the figures is shown as running from right to left, when looking at Fig. 1. The usual fingers 16, are placed in cooperative relationship to the cutter knives at 17, though at the designed speed of the V belt and its carried cutter knives, it is believed that more grain is severed by impact than against the fingers.

Considering now the disposal of the cut crop. It has been, formerly, proposed to pick it up by a suction nozzle, but getting an equal distribution of the suction effect over a nozzle wide enough to take care of a cutterhead of desirable width proved very difficult and I believe that that difficulty made the suction nozzle pick up impractical. I have solved the difficulty by placing an open side tube 20, formed with an apron portion 21, with the edge of the latter reaching as close as is practicable to the volute vanes 13. The air drawn in, usually a problem with devices that move material pneumatically, is here employed to build up a substantial pneumatic pressure within the open side tube 20 with a strong blow towards the delivery tube 22, of which the open side tube 20 is a continuation. The endwise draft or pneumatic thrust is ample to pile cut material in a windrow alongside the cutter as it travels. However, the delivery tube 22 will be connected to a suction fan, not shown, to be disposed of by means not encompassed in this invention.

As will be noted, the open side tube 20, is tapered from its right hand end, where the pneumatic operation is initiated to dispose of cut material, reaching the full size of the delivery tube 22 at the left hand side of the cutter head.

Figure 5:
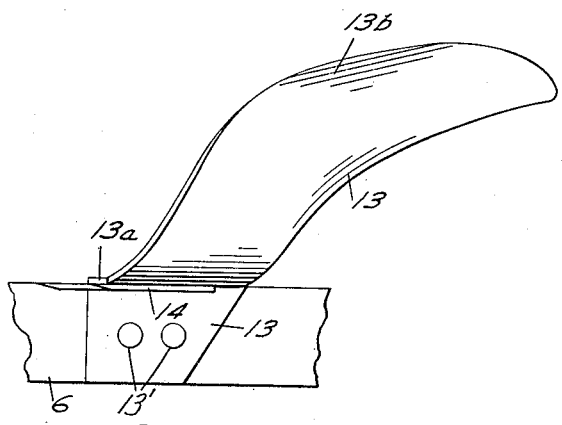
Fig. 5 is an enlarged view of the upstanding vane, without which the other valuable cooperative structures could not be operable. These vanes serve as a complete substitute for the old reel without its drawbacks, as will be explained.

Making the vanes as shown with an angular lower portion, Fig. 5, with a knife secured in the angle, is believed to be of substantial advantage.

Figure 2:
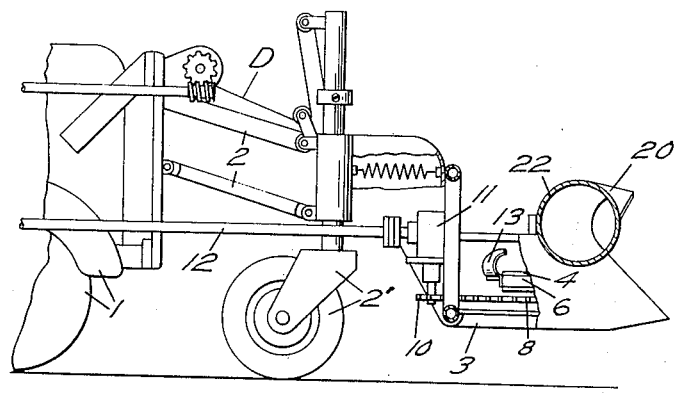
Fig. 2 is a side elevation of Fig. 1 with the delivery tube 22 cut away on the section line 2—2 of Fig. 1.
Figure 3:
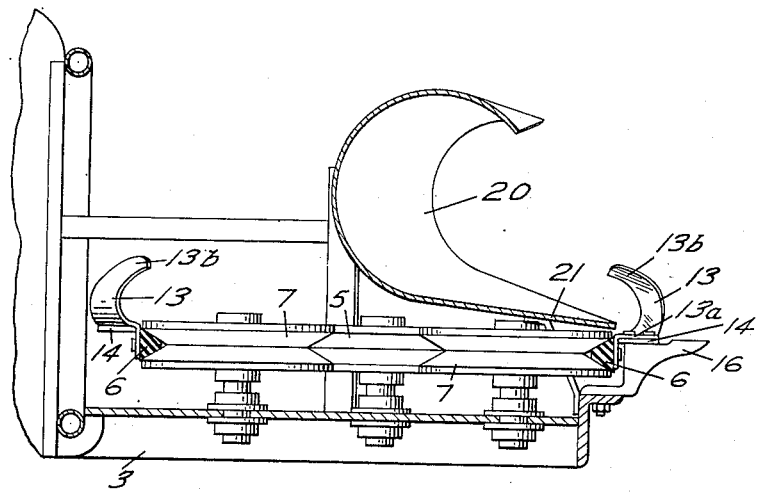
Fig. 3 is a section taken on the plane 3—3 of Fig. 1, at a two and one-half to one scale of enlargement.
Figure 4:
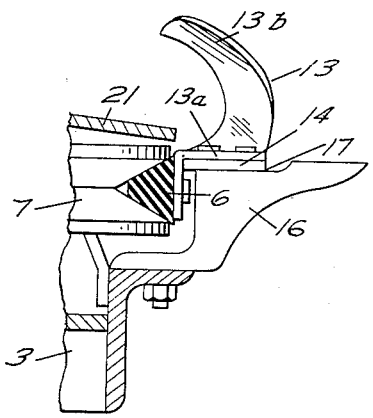
Fig. 4 is a detail of Fig. 3, showing the upstanding curved air moving vane at twice the scale it is shown at the extreme right of Fig. 3.

The parallel motion structure 2, for the support of the cutterhead hereinbefore described, is supplemented by a spaced pair of casters with wheels, one being indicated by 2' in Fig. 2, the other one being hidden by superstructure in Fig. 1, the whole representation being schematic. The cutterhead as a whole will be capable of being lifted on the staff of the caster 2' by the worm gear set C operating the shaft B to selectively wind or unwind ropes D with respect to the rope drums A.

Having fully disclosed my improved cutter head, what I claim as new and desire to secure by Letters Patent, is:

1. A cutter head for a harvester or the like comprising a unidirectional belt, means for operating the belt, cutter knives in spaced relationship on said belt, upstanding volute type vanes associated with said knives to draw standing grain into the knives, said vanes beginning at the outer tips of the knives and curving inwardly therefrom to drive air and cut material backwards from said knives.

2. A cutterhead for a harvester or the like comprising a unidirectional knife carrying belt, knives on said belt in spaced relationship, upstanding air moving vanes associated with said knives and having their leading ends substantially conterminous with the knives and their trailing ends curved backwards over the knives, and an open sided tubular member formed with an apron portion positioned immediately to the rear of the cutting reach of the knife carrying belt, to receive the cut material.

3. The combination as claimed in claim 2, in which the open sided tubular member is increasingly tapered in the direction in which the belt and the cut material moves.

4. A cutter head for a harvester or the like comprising a belt, knives in spaced relationship on said belt to operate as crop cutters on one reach of the belt when the belt is running, upstanding vanes joined with some of said knives, said vanes of volute form with their leading ends just outside of a cutter knife and their trailing portions curved inwardly and upwardly over the knife with which they are joined and a succeeding knife so that one vane serves two knives.

5. The combination as claimed in claim 4, in which an open sided tube, having an apron portion, is positioned immediately to the rear of the running position of the knives.

6. A cutter head for a combine harvester or the like, comprising a belt mounted for horizontal operation at high speed with one reach of the belt normal to the line of motion of the harvester and spaced above the ground in grain contacting position, upstanding volute shaped vanes mounted in spaced position on said belt, horizontal knives made rigid with said vanes, the leading end of a vane being substantially conterminous with the leading end of the carried knife, the vane being upstanding above the knife and curved inwardly over it to draw an air current towards the knife, with standing grain affected by the air current and to direct both air and cut grain back from the knife.

7. The combination as claimed in claim 6 and including a tapered, open sided tube positioned to receive air and cut material through its open side and having means cooperative therewith to dispose of the air and material.

FRED H. TEMPLETON.

REFERENCES CITED

The following references are of record in the file of this patent:

UNITED STATES PATENTS

| Number | Name | Date |
|---|---|---|
| 691,846 | Dominy | Jan. 28, 1902 |
| 1,122,375 | Engle | Dec. 29, 1914 |
| 1,656,105 | Durkee | Jan. 10, 1928 |
| 1,844,750 | Ellis | Feb. 9, 1932 |
| 2,026,291 | Tirimacco | Dec. 3, 1935 |
| 2,071,872 | Cockburn | Feb. 23, 1937 |
| 2,186,126 | Roll | Jan. 9, 1940 |
| 2,474,557 | Templeton | June 28, 1949 |
| 2,488,886 | Young | Nov. 22, 1949 |